United States Patent Office 3,115,172
Patented Dec. 24, 1963

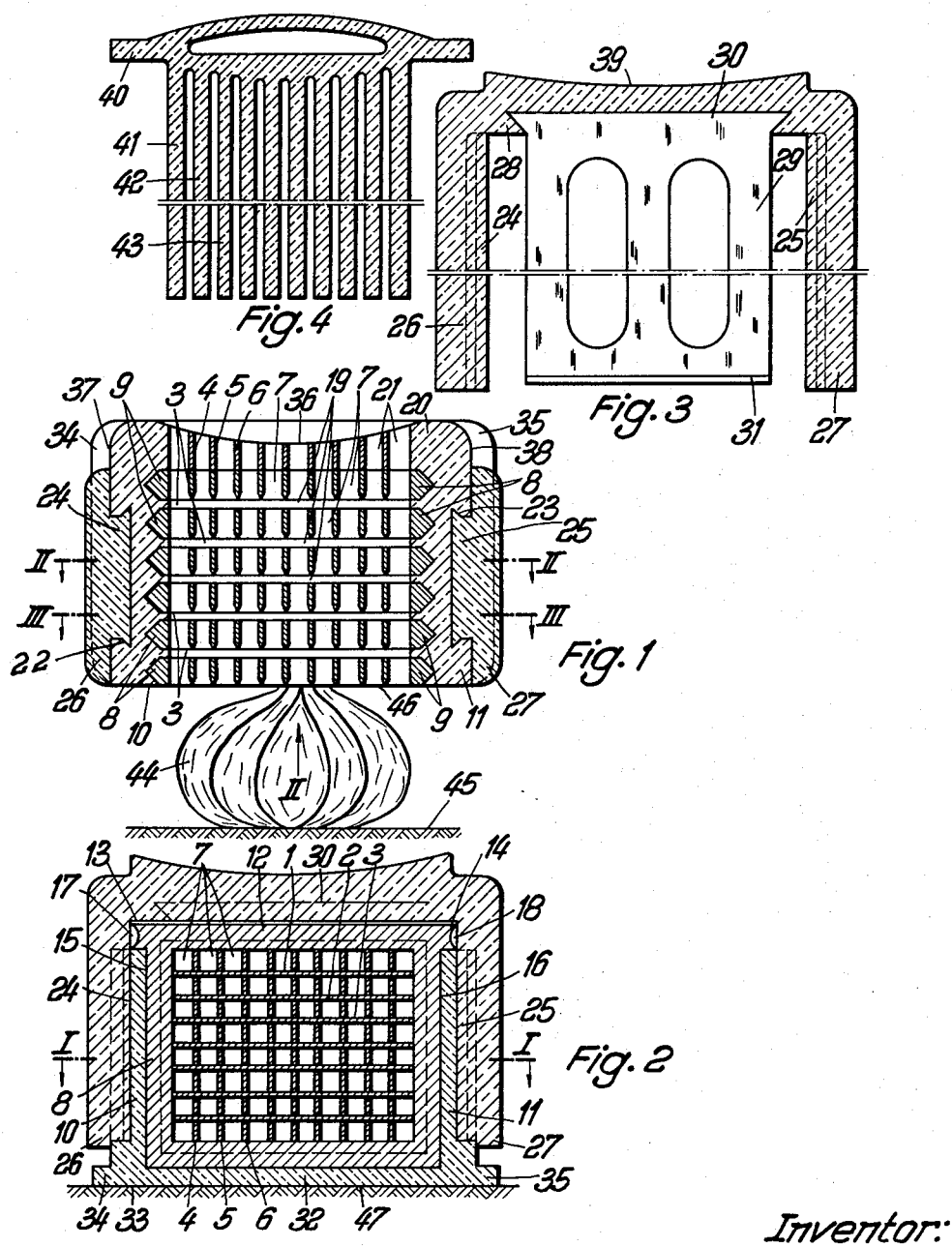

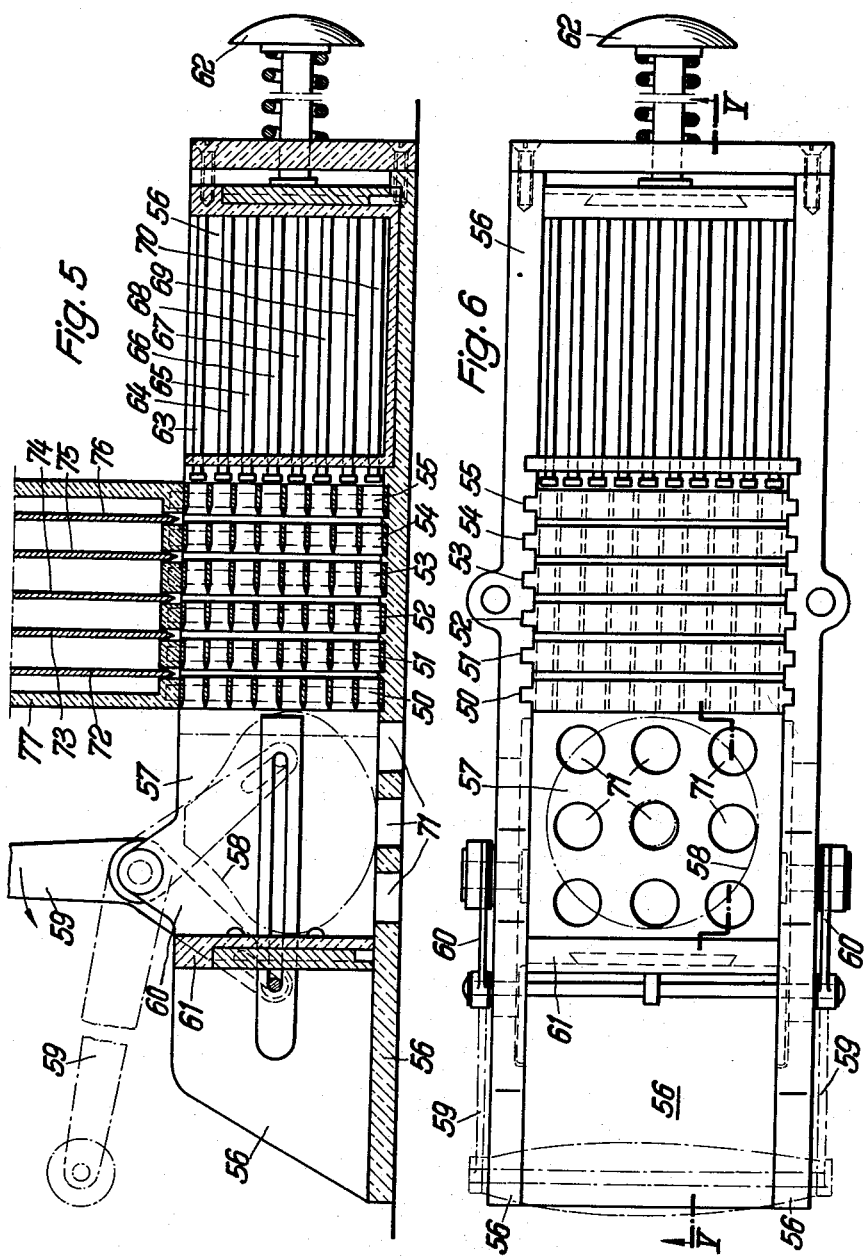

3,115,172
FOOD DICER
Karl Ludwig Georg Meurer von Inffeld, am Alten
Rhein 24, Dusseldorf-Benrath, Germany
Filed June 7, 1962, Ser. No. 200,752
Claims priority, application Austria June 9, 1961
5 Claims. (Cl. 146—78)

This invention relates to a manually operable device for dividing bodies into a plurality of smaller bodies, preferably of identical shape, e.g., identical cubes.

It is an object of the invention to provide a simply operable, compact device for comminuting fruit, vegetables and the like, which device is simple in structure, can be manufactured at low cost and has only a small number of parts. To solve the problem, the device according to the invention is characterized by the provision of a plurality of spaced apart cutting and guiding grids, and knife blades guided in planoparallelism with the planes of the cutting and guiding grids, each of which knife blades can be introduced into the space between two successive grids. The cutting and guiding grids may be replaceably inserted in a framelike housing, which receives supported material to be cut. The housing holding the preferably replaceable grids may consist of a frame member, which can be held and moved by hand and which extends over supported material to be cut.

When the set of cutter blades is held in a U-shaped frame member which is guided in the hollow housing body in planoparallelism to the planes of the cutting and guiding grids, all essential parts of the device embodying the invention have already been mentioned so that the desired simplification, greater compactness and inexpensive construction of the comminuting device have thus been achieved. Nevertheless, the required forces necessary for cutting the material to be cut are available. Because the hollow housing body consists of a manually moved member capable of three-dimensional movement, the weight and arm forces of the operator of the device may be used to place the hollow body together with the cutting and guiding grids held by it over the supported material to be cut, e.g., an onion, and to force the device onto the material so that the onion is cut into bars in the cutting grids of the hollow body. On the other hand, the forces required for moving the set of cutter blades are inherently small because the material to be cut has already been divided into bars, which can be severed to form cubes by forces which do not substantially exceed those for freely moving a knife.

If the bottom of the hollow body has openings which adjoin guides formed by the guiding grids for slices made from the material to be cut and which have a cross-section which is equal to the clear cross-section of the spaces confined by the cutting and guiding grid knives, the device may have associated with it a loose set of ejecting plungers, which are jointly movable through the openings in the bottom of the hollow body. Only in this case does the device have this third part, which then facilitates the operation. This part is not necessary because the material cut into cubes may also be exposed by rapping it out of the housing or by pulling out the cutting grid and the guiding grids, because it is suitable to provide cutting and guiding grids which are replaceable and can be pulled out of the hollow body, within the scope of the present invention. The operation of the device will be further facilitated if the housing bottom has at its outer boundary surface a concave curvature for receiving the ball of the thumb of the operating hand. For the same purpose, the edges of the bottom of the housing will be considerably rounded so that even a housewife having only relatively small forces can divide the material to be cut into bars by leaning on the housing with the entire weight of her body so that the material to be cut is forced into the cutting grid. The outside boundary surface of the crosspiece of a U-shaped frame member holding the set of knife blades is suitably concavely curved for the same reason: in this case, the housing must be turned through 90° because the direction of movement of the set of knife blades must always be at right angles to the direction of movement of the cutting grid when dividing the material to be cut into bars. For this reason, it may be suitable to give the housing, which should extend over the material to be cut like a bell or a hollow cube, such an external shape so that it is forced against the hand or hands holding it. In the first case, the shape is preferably that of a parallelepiped or, as has been mentioned hereinbefore, a cube having rounded edges so that bearing surfaces are obtained which provide for the required support of the device on a supporting surface, e.g., a table top, when the bars are cut into cubes. The reference to a housing extending over the material to be cut like a bell does not mean that the housing has also the external shape of a bell. On the contrary, the basic form of the housing is preferably that of a hollow cube, two opposite cube walls having the slotlike openings which serve to receive the limbs of the U-shaped frame, the crosspiece of which suitably holds the knives of the cutting grid and the guiding grids.

Further details and advantages will be explained with reference to an illustrative embodiment which is shown on the drawing.

In the drawing, FIG. 1 is a vertical transverse sectional view showing the comminuting device according to the invention in a position above the material to be cut into cubes, which is supported, e.g., placed on a kitchen table; the section is taken on line I—I of FIG. 2. This is a top plan view showing the knife grid which closes the housing and is flush with the lower boundary surface in the position of FIG. 1; the direction in which the view of FIG. 2 is taken is indicated by the arrow II in FIG. 1. On the other hand, the frame member for holding the set of knife blades is shown in FIG. 2 in a sectional view taken on line II—II of FIG. 1. FIG. 3 is another sectional view taken on line III—III in FIG. 1 and showing the frame member holding the set of knife blades, whereas the top plan view of the housing has been omitted to show more clearly the design of the set of knife blades and of the frame member holding the same. FIG. 4 is a vertical longitudinal sectional view of the ejector, consisting of a loose individual member, with the ejecting plungers, in the position from which it is sufficient to introduce it into the housing, which is in the position of FIG. 1, by a movement from top to bottom, in order to force the material cut into cubes out of the guiding space formed by the knife grid and the guiding grids. FIGS. 5 and 6 show another embodiment according to the invention.

FIG. 2 shows the construction of the cutting grid, which closes the opening of the housing having the shape of a hollow cube, which opening is at the bottom in FIG. 1. The horizontally extending knives 1, 2, 3, etc., are apparent as well as the vertically extending knives 4, 5, 6, etc. The knives 1, 2, 3, etc., 4, 5, 6, etc. define in clear cross-sections 7 in the form of squares. It is obvious that these square cross-sections may be replaced by any other cross-sectional shapes, e.g., triangular, rectangular or hexagonal ones. The knives 1, 2, 3, etc.; 4, 5, 6, etc. are held in frames 8, which are arranged in corresponding recesses 9 of the side walls 10, 11 of the hollow-cubical housing for replaceably receiving the cutting grids. Those limbs 12 of the frames 8 which are on top in FIG. 2 have extensions 13, 14, which slightly protrude over the boundary surfaces 15, 16 of the downwardly adjoining limbs of the frames 8 and in conjunction with niches 17, 18 enable the individual frames 8 to be easily gripped with the fingertips of fingernails and to be pulled out of the recesses 9 of the housing wall parts 10, 11 so that the frames are replaceable.

FIG. 1 shows that the cutting grid comprising the knives 1, 2, 3, etc.; 4, 5, 6, etc. is not directly succeeded by the next guiding grid but a narrow space 19 is formed between the two grids, in which one of the knife blades of a set of knife blades, which will be discussed hereinafter, can be introduced. The remarks relating to the guiding grid succeeding the cutting grid apply also to the arrangement of the following guiding grids, which define narrow spaces 19 between adjacent grids. The walls 10, 11 are connected by a wall portion 20, which is called a bottom. The bottom 20 has openings 21, the cross-section of which is identical with the clear cross-section 7 defined by the knives and guide walls 1, 2, 3, etc.; 4, 5, 6, etc. The housing walls 10, 11 have dovetail-shaped recesses at 22, 23. Correspondingly shaped, striplike projections 24, 25 of the limbs 26, 27 of a U-shaped frame member can be introduced into the resulting guides. The crosspiece 28 of the frame member connects the limbs 26, 27. This crosspiece 28 serves for holding the knife blades 29, etc. of a set of knife blades, which is so arranged that when the projections 24, 25 of the limbs 26, 27 of the frame member 26–28 are inserted in the recesses 22, 23, the knife blades 29, etc. will lie in the spaces 19 between the cutting and guiding grids. That portion of the knife blades 29 which is thus held is indicated at 30.

The knife blades 29 are similar to razor blades; they have an extremely small wall thickness. If they are thicker, special cutting edges 31, which may be hollow-ground, are suitably provided. Of the housing walls which connect the walls 10, 11 to form a hollow cube, only the wall 32 is shown in FIG. 2. This wall 32 forms a boundary and supporting edge 33, by means of which the housing 10, 11, 32 is supported when the material to be cut, which has been pre-cut into bars, is divided into cubes by means of the set of knife blades. To provide a supporting surface 33 which is as large as possible, the housing wall 32 has protruding portions 34, 35. To facilitate the manipulation of the housing 10, 11, 32, the outer boundary surface 36 of the housing bottom 20 defines a concavely curved recess so that a large and sufficient surface is provided for the engagement of the ball of the thumb of the hand operating the device. The wall opposite to the wall portion 32 is not apparent in the figures and has no reference numeral. When the housing is in the position shown in FIG. 1, this opposite wall lies before the plane of the drawing and parallel to it just as the wall 32 lies behind it.

FIG. 1 indicates also that the concavely curved boundary surface 36 of the bell bottom 20 merges with large, well-rounded transitional portions 37, 38 into the boundary surfaces of the housing, which boundary surfaces extend vertically in that area, so that large supporting and pressure forces are exerted onto the boundary surfaces without causing undesired pressure marks to form on the actuating hand. For the same reason, the crosspiece 28 of the frame member 26–28 holding the knife blades 29 has the concavely curved boundary surface 39 so that an undesired pressure mark will not be formed on the actuating hand when the knife blades 29 are driven into the spaces 19 to divide the bars of the material to be cut into cubes.

FIG. 4 shows the ejector. It consists of a head plate 40, from which the individual ejecting plungers 41, 42, 43, etc. extend. The cross-section of each of the ejecting plungers 41, 42, 43, etc. agrees with the cross-section of the openings formed in the bottom 20 of the holding housing 10, 11, 32 for the grids so that cubes of cut material which are in the spaces having the cross-sections 7 can readily be forced out of these spaces by inserting the plungers 41, 42, 43, etc., by means of the common holding plate 40 through the openings 21 of the bottom 20 into the spaces having the cross-sections 7 so that the cubes of cut material are forced out of said spaces.

It is apparent from FIG. 1 that substantially only the cutting grid, which has the boundary surface 46 facing the supporting surface 45 for the material to be cut 44, serves for cutting the material to be cut and has suitably formed cutting edges. For this reason, only the knives of this grid must consist of metallic workpieces, particularly stainless steel. On the other hand, the walls which guide the remaining grids serve for guiding rather than for cutting so that these guiding parts need not be made from metallic workpieces. Non-metallic workpieces, particularly plastic grids, are perfectly sufficient for guiding the material to be cut. Particularly where a uniform construction of the cutting grids is desired, this does not preclude the manufacture of the guiding walls of these cutting grids also of metallic materials.

Because the skin of the onion is usually removed before the onion is cut, such unskinned onions are very slippery because they have a thin liquid film, which is not evaporated immediately after the removal of the skin from the onion. For this reason, such onions tend to slip, particularly when the device is not placed on the onion exactly at right angles to the supporting surface 45. Besides, the device may be operated by more or less skilled operators so that it may be suitable to associate with the housing 10, 11, a special base plate 32 having a socket for guiding the housing.

It is inherent in the nature of the invention that a device thus constructed may also be used for other purposes. For instance, when the guiding grids disposed in the direction of movement of the housing 10, 11, 32 opposite to the direction of the arrow II in FIG. 1 behind the cutting grid which closes the mouth of the housing are pulled out from the guides 9 for their frames 8, said movement will only cause the material to be cut to be divided into bars whereas the frame member 26–28 with the set of knife blades 29 remains unused. In this case, the material to be cut 44 can be cut only into bars, as is required, e.g., for making pommes frites or certain salads. In other cases, the material should be cut into slices. This can also be achieved without difficult by means of the device shown. The mode of operation of the device is extremely simple.

FIG. 1 shows material to be cut in the form of an onion 44, which is to be divided into cubes. The onion rests on a support 45, e.g., a kitchen table, or a chopping board lying on the table. When the device is in the position shown in FIG. 1, it is sufficient to engage the surface 36 with the actuating hand and force the device so strongly onto the onion that the latter enters the interior of the housing. By the knives 1, 2, 3, etc.; 4, 5, 6, etc. of the cutting grid facing the onion, the latter if divided into bars, which successively pass through the spaces defined in the guiding grids succeeding in the direction in which pressure is applied, which spaces have the cross-section 7. Finally, the lower cutting face 46 and the supporting surface 45 contact each other. At that time, the onion 44 has been completely received in the interior of the housing and has been cut into bars. The device is now moved from the position shown in FIG. 1 into the position shown in FIG. 2 by turning it through a right angle so that the end face 47 of the housing wall 32 contacts now the supporting surface 45. When the device is in this position, the frame member 26–28, which was previously outside the housing, is moved into such a position relative to the housing that the projections 24, 25 enter the recesses formed by the dove-tail-shaped undercut portions 22, 23. As a result, the knife blades 29 of the set of knife blades lie exactly opposite to the spaces 19 between the knife grids and enter the spaces 19 when the frame member 26–28 is moved toward the supporting surface 45. This causes the bars cut from the material 44 to be divided into cubes, which are now in the spaces having the cross-sections 7. Afterwards, it is sufficient to insert the ejector 40 having the ejecting plungers 41, 42, 43 into the opening 21 to enable the ejection of the resulting cubes from the spaces having the cross-sections 7. Even where an ejector is not used, the cubes of the cut material disposed in the spaces having the cross-sections 7 may be removed by rapping when the device has been turned into the position of FIG. 1. Alternatively, the limbs 26, 27 of the frame member 26–28 may be pulled out of the recesses 22, 23 of the housing and then the individual cutting grid frames 8 may be removed out of the housing with the aid of the projections 13, 14. A simple knocking of the frames on a support will cause the cubes contained in the spaces having the cross-section 7 to fall out so that these cubes need only be collected.

FIGS. 5 and 6 show an embodiment of the invention in which the cutting and guiding grids 50–55 are replaceably inserted in a U-shaped frame 56. FIG. 5 is a longitudinal sectional view taken on line V—V in FIG. 6 and showing the onion cutter and FIG. 6 is a top plan view showing the onion cutter. The left-hand portion of the frame 56 contains the space 57 for receiving the onion 58 and a stop 61, which is displaceable by a manually operable lever mechanism 59, 60 and which forces the onion 58 into the cutting and guiding grids 50–55. In the right-hand portion of the frame 56, the ejecting plungers 63–70 are arranged, which are operable by a spring-loaded handle 62 and force the cubes out of the cutting and guiding grids 50–55 into the collecting space 57 so that they can fall out of the frame 56 through the holes 71. The knife blades 72–76 which can be pushed between the individual cutting and guiding grids 50–55 are also operated by a handle, not shown, which is shaped like the handle 62. The knife blades 72–76 are guided in a housing 77 which is placed on the frame 56.

It is inherent in the nature of the invention that it is not exhausted in the embodiment shown by way of example. The invention may be embodied in widely different ways. For instance, it is not necessary to weld or otherwise connect the knives of the knife grid at the intersections. For instance, the knives may consist of individual strips, which are inserted into the frame member consisting of plastics. In that case the knives are formed at the intersections with a slot which extends through one half of the width of the knife and the slots of intersecting knives are arranged so that each slot receives the continuous, solid portion of the other knife.

What is claimed is:

1. A food dicing device comprising, in combination, a U-shaped housing having a pair of spaced parallel walls and a transverse wall connecting said parallel walls; a plurality of grids removably mounted in said parallel walls of said housing and extending substantially parallel to and substantially equally spaced from each other substantially normal to said walls through the space defined between said walls, at least one of said grids at one end of said plurality of grids being a cutting grid provided on the side thereof facing away from the grid adjacent thereto with cutting edges; a cutting knife unit comprising a plurality of cutting knives having each an area substantially equal to that of said grids and a thickness substantially equal to the spacing between said grids, said knives of said cutting knife unit arranged to move between said grids; a pressure plate spaced from and facing said one grid; lever means mounted on said housing and connected to said pressure plate for moving the latter toward and away from said one grid for pressing food to be diced against said one grid; and ejector means facing the grid on the other end of said plurality of grids and having a plurality of fingers adapted to move through the grids for ejecting diced food particles therefrom.

2. A device as set forth in claim 1 in which said pressure plate is formed with a plurality of short projections facing said one grid.

3. A device as set forth in claim 1 and including an additional housing removably mounted on said U-shaped housing and provided with guide means for guiding said cutting knife unit during movement of said knives between said grids.

4. A food dicing device comprising, in combination, a U-shaped housing having a pair of spaced parallel walls and a transverse wall connecting said parallel walls, said parallel walls being formed with a plurality of substantially equally spaced substantially parallel grooves extending into the walls from inner surfaces thereof and in longitudinal direction substantially normal to said transverse wall; a plurality of grids removably mounted in said grooves, respectively, and extending transversely through the space defined between said walls, at least one of said grids at one end of said plurality of grids being a cutting grid provided on the side thereof facing away from the grid adjacent thereto with cutting edges; a cutting knife unit comprising a plurality of cutting knives having each an area substantially equal to that of said grids and a thickness substantially equal to the spacing between said grids, said knives being connected to each other at one end thereof and being arranged parallel to and spaced from each other a distance substantially equal to the thickness of each of said grids, said knives of said cutting knife unit arranged to move between said grids; and cooperating means on said U-shaped housing and said cutting knife unit for guiding the latter during movement of the knives of said cutting knife unit between said grids.

5. A food dicing device comprising, in combination, a U-shaped housing having a pair of spaced parallel walls and a transverse wall connecting said parallel walls, said parallel walls being formed with a plurality of substantially equally spaced substantially parallel grooves extending into the walls from inner surfaces thereof and in longitudinal direction substantially normal to said transverse wall, and each of said parallel walls being formed with an undercut groove extending from the outer surface into the respective wall and longitudinally substantially normal to said transverse wall; a plurality of grids removably mounted in said grooves, respectively, and extending transversely through the space defined between said walls, at least one of said grids at one end of said plurality of grids being a cutting grid provided on the side thereof facing away from the grid adjacent thereto with cutting edges; a cutting knife unit comprising a U-shaped frame having a pair of leg portions having each a longitudinal portion matching in cross-section to said under cut groove and being spaced from each other to be insertable into said undercut groove to be guided therein, a transverse portion extending between and connecting said leg portions, and a plurality of cutting knives having each an area substantially equal to that of said grids and a thickness substantially equal to the spacing between said grids, said knives being connected along one edge portion thereof to said transverse portion of the U-shaped frame and extending therefrom parallel to and spaced from each other a distance substantially equal to the thickness of each of said grids, said knives of said cutting knife unit arranged to move between said grids and said cutting knife unit being guided during such movement by said longitudinal portions of said leg portions engaged in said undercut grooves.

References Cited in the file of this patent

UNITED STATES PATENTS

| | | |
|---|---|---|
| 2,157,604 | Gray | May 9, 1939 |
| 2,559,554 | Zahner et al. | July 3, 1951 |
| 2,621,691 | Brualdi | Dec. 16, 1952 |

FOREIGN PATENTS

| | | |
|---|---|---|
| 471,678 | Great Britain | Sept. 6, 1937 |